US012782910B2

(12) United States Patent
Yoshida et al.

(10) Patent No.: US 12,782,910 B2
(45) Date of Patent: Nov. 3, 2026

(54) ESTIMATION METHOD AND ESTIMATION SYSTEM

(71) Applicant: Panasonic Intellectual Property Management Co., Ltd., Osaka (JP)

(72) Inventors: Hiroko Yoshida, Osaka (JP); Nobuo Hara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1192 days.

(21) Appl. No.: 17/662,236

(22) Filed: May 6, 2022

(65) Prior Publication Data

US 2022/0382247 A1 Dec. 1, 2022

(30) Foreign Application Priority Data

May 27, 2021 (JP) ................................ 2021-088876

(51) Int. Cl.
*G05B 19/408* (2006.01)
*B23K 9/095* (2006.01)
(Continued)

(52) U.S. Cl.
CPC ........ *G05B 19/4083* (2013.01); *B23K 9/0953* (2013.01); *G05B 19/182* (2013.01); *G05B 19/4063* (2013.01)

(58) Field of Classification Search
CPC .............. G05B 19/4083; G05B 19/182; G05B 19/4063; B23K 9/0953
See application file for complete search history.

(56) References Cited

U.S. PATENT DOCUMENTS

| | | | |
|---|---|---|---|
| 2013/0190920 | A1 | 7/2013 | Michishita et al. |
| 2018/0043453 | A1 | 2/2018 | Yamasaki et al. |
| 2021/0132578 | A1 | 5/2021 | Yabune et al. |

FOREIGN PATENT DOCUMENTS

| | | |
|---|---|---|
| AU | 2020445198 | 12/2021 |
| JP | 7-056608 | 3/1995 |

(Continued)

OTHER PUBLICATIONS

Dmochowski et al "Design of Timing Error Detectors for Orthogonal Space-Time Block Codes," 2006 IEEE 17th International Symposium on Personal, Indoor and Mobile Radio Communications, Helsinki, Finland, 2006 (Year: 2006).*

(Continued)

*Primary Examiner* — Ryan F Pitaro
*Assistant Examiner* — Adrian Stoica
(74) *Attorney, Agent, or Firm* — Wenderoth, Lind & Ponack, L.L.P.

(57) ABSTRACT

A processor performs an experiment of machining a device to acquire first-type and second-type information each indicating conditions of the experiment of machining and third-type and fourth-type information each indicating a result of the experiment of machining. The processor derives a first expression and a second expression, where the first expression receives first-type and second-type information as inputs and outputs third-type information as more than one solution, and the second expression receives first-type and second-type information as inputs and outputs fourth-type information. The processor derives more than one third expression from the first expression, where the more than one third expression each receives second-type and third-type information as inputs and outputs first-type information. The processor receives second-type and third-type information each measured in machining as inputs and (Continued)

outputs fourth-type information indicating a result of machining using the second expression and the more than one third expression.

8 Claims, 12 Drawing Sheets

(51) Int. Cl.
*G05B 19/18* (2006.01)
*G05B 19/4063* (2006.01)

(56) References Cited

FOREIGN PATENT DOCUMENTS

| | | |
|---|---|---|
| JP | 2007-160350 | 6/2007 |
| JP | 2010-042499 | 2/2010 |
| JP | 4539619 B | 9/2010 |
| JP | 2012-096328 | 5/2012 |
| JP | 2016-159323 | 9/2016 |
| JP | 2019-048309 | 3/2019 |
| JP | 6810820 B | 1/2021 |
| JP | 6854990 B | 4/2021 |
| JP | 2021-071818 | 5/2021 |

OTHER PUBLICATIONS

Wu et al "Accurate characterization of weld appearance induced by T-joint laser stake-welding by integration of ANFIS approach and numerical simulation" vol. 37, Issue 6 (Year: 2019).*

Woizeschke et al -Laser keyhole micro welding of aluminum foils to lap joints even with large gap sizes CIRP Annals-Manufacturing Technology (Year: 2020).*

Wolfram Mathworld (Year: 2020).*

* cited by examiner

FIG. 16

| Case # | First parameter A | First parameter B |
|---|---|---|
| 1 | 20.8197993978173 | 68.389200624825520 |
| 2 | 14.6506459639329 | 74.5583540587100 |
| 3 | 10.2341703695108 | 74.1310421356520 |
| 4 | 23.4700190253411 | 60.8951934798217 |
| 5 | 43.0218838343464 | 63.7922375349461 |
| 6 | 27.9910291954951 | 78.8230921737975 |
| 7 | 19.2218590116471 | 47.5382321468659 |
| 8 | -8.08941167467625 | 74.8495028331893 |
| 9 | -6.79637165322645 | 73.5564628117395 |
| 10 | 21.8133061779210 | 67.3956938447219 |
| 11 | 22.4950362052126 | 61.8701762999502 |
| 12 | 22.1887099717661 | 84.6254113975265 |
| 13 | 33.3800455792565-12.6405892116683i | 33.3800455792565+12.6405892116683i |
| 14 | 18.1908748442109 | 77.3987920930167 |
| 15 | 29.7514025977676 | 77.0627187715250 |
| 16 | 30.4079459001811 | 47.5765996903968 |
| 17 | 10.5075515938254 | 78.7014484288174 |
| 18 | 22.3450839069892 | 62.0201285981736 |
| 19 | 43.3935531319514-7.72704543697020i | 43.3935531319514+7.72704543697020i |
| 20 | 49.0057803479839-11.2528561961463i | 49.0057803479838+11.2528561961463i |
| 21 | 35.1539031532463 | 51.6332031106565 |

FIG. 17

| Case # | First parameter A | First parameter B | First parameter C | First parameter to be selected | True value | Difference [%] |
|---|---|---|---|---|---|---|
| 1 | 20.8197994 | 68.38920062 | 25.2997927118613 | A | 25 | 16.7 |
| 2 | 14.65064596 | 74.55835406 | 70.3117730533986 | B | 75 | 0.6 |
| 3 | 10.23417037 | 74.13104214 | 62.4168904228397 | B | 75 | 1.2 |
| 4 | 23.47001903 | 60.89519348 | 10.9669409871634 | A | 25 | 6.1 |
| 5 | 43.02188383 | 63.79223753 | 87.7272646118226 | B | 75 | 14.9 |
| 6 | 27.9910292 | 78.82309217 | 70.3262086675422 | B | 75 | 5.1 |
| 7 | 19.22185901 | 47.53823215 | 21.7900791577108 | A | 25 | 23.1 |
| 8 | -8.089411675 | 74.84950283 | 92.908518116629 | B | 75 | 0.2 |
| 9 | -6.796371653 | 73.55646281 | 76.7555310412048 | B | 75 | 1.9 |
| 10 | 21.81330618 | 67.39569384 | 29.1161533541944 | A | 25 | 12.7 |
| 11 | 22.49503621 | 61.8701763 | 25.1739946568773 | A | 25 | 10.0 |
| 12 | 22.18870997 | 84.6254114 | 25.3150332049976 | A | 25 | 11.2 |
| 13 | 33.380045579 | N/A | 41.700259249317 | A | 25 | 33.5 |
| 14 | 18.19087484 | 77.39879209 | 71.0672842268678 | B | 75 | 3.2 |
| 15 | 29.7514026 | 77.06271877 | 18.3569398154341 | A | 25 | 19.0 |
| 16 | 30.4079459 | 47.57659969 | 49.8721003714618 | B | 50 | 4.8 |
| 17 | 10.50755159 | 78.70144843 | 67.4935064526114 | B | 75 | 4.9 |
| 18 | 22.34508391 | 62.0201286 | 58.9074975388409 | B | 52.75 | 17.0 |
| 19 | 43.393553132 | N/A | 52.5936507294314 | A | 50 | 13.2 |
| 20 | 49.005780348 | N/A | 52.8639249383576 | A | 50 | 2.0 |
| 21 | 35.15390315 | 51.63320311 | 22.8904018664067 | A | 25 | 40.6 |

ESTIMATION METHOD AND ESTIMATION SYSTEM

BACKGROUND

1. Technical Field

The present disclosure relates to an estimation method and to an estimation system.

2. Description of the Related Art

Conventionally, some models related to machining a device have been used. For such models, a lot of cases have been reported in which parameters of an objective variable (output variable) are estimated from parameters of an explanatory variable (input variable). If a physical model based on actual physical phenomena can be configured, parameters of an objective variable are estimated using this physical model, allowing highly accurate estimation as well as reducing the worker's hours for measurement required for modeling.

Meanwhile, if a physical model is hard to be configured, there is known for example a method in which a lot of accumulated measured data is used to assume I/O relationships using a polynomial expression model for estimation by fitting. An estimation method created by combining these two methods has been devised as well (refer to PTL 1).

CITATION LIST

[PTL 1] Unexamined Japanese Patent Publication No. 4539619

SUMMARY

An estimation method according to one aspect of the present disclosure is an estimation method executed by a processor using memory. This method includes the following four steps. First, the processor performs an experiment of machining a device to acquire first-type, second-type, third-type, and fourth-type information, where the first-type and second-type information each indicates conditions of the experiment of machining; and the third-type and fourth-type information each indicates a result of the experiment of machining. Second, the processor derives first and second expressions, where the first expression receives the first-type and second-type information as inputs and outputs the third-type information as more than one solution; and the second expression receives the first-type and second-type information as inputs and outputs the fourth-type information. Third, the processor derives more than one third expression from the first expression from the first expression, where each of the more than one third expression receives the second-type and third-type information as inputs and outputs the first-type information. Finally, the processor receives the second-type and the third-type information each measured in machining the device as inputs and outputs the fourth-type information indicating a result of machining of the device using the second expression and the more than one third expression.

An estimation system according to one aspect of the present disclosure includes an acquisition unit that, after an experiment of machining a device is performed, acquires first-type and second-type information each indicating conditions of the experiment of machining a device and third-type and fourth-type information each indicating a result of the experiment of machining; a derivation unit that derives a first expression and a second expression, where the first expression receives the first-type and second-type information as inputs and outputs the third-type information as more than one solution and the second expression receives the first-type and second-type information as inputs and outputs the fourth-type information, and also derives more than one third expression from the first expression, where each of the more than one third expression receives the second-type and third-type information as inputs and outputs the first-type information; and an estimation unit that receives the second-type and third-type information each measured in machining the device and outputs the fourth-type information indicating a result of machining the device using the second expression and more than one third expression.

These comprehensive or concrete aspects may be implemented by a system, method, integrated circuit, computer program, or recording medium (e.g., computer-readable CD-ROM), or any combination of them.

BRIEF DESCRIPTION OF THE DRAWINGS

FIG. 16 is a first explanatory diagram of the validity of a single first parameter selected.

FIG. 17 is a second explanatory diagram of the validity of a single first parameter selected.

DETAILED DESCRIPTIONS

Figure 1:
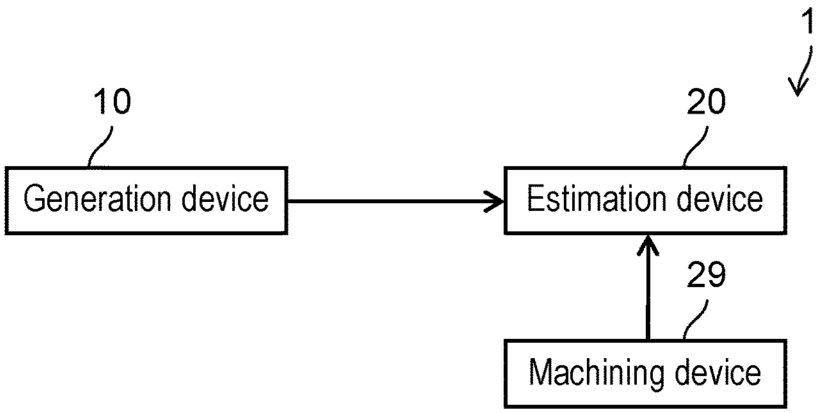
FIG. 1 is an explanatory diagram of the configuration of a system according to an embodiment.

The above conventional methods are all on the assumption that the measured data of the parameters of explanatory variables are collected inline in machining a device.

To obtain a model that allows an objective variable to be estimated highly accurately, meanwhile, the explanatory variable may include a parameter not collected inline as measured data. In this case, to utilize the model inline, some means needs to be devised such as combining another experimental design in which a parameter the measured data of which are not collected inline is an output variable.

Even so, however, input variables in another experimental design may not be able to generate an experimental point as designed due to the property of the variable. Besides, even if an experimental point has been generated as designed, experimental design needs to be executed twice, undesirably doubling the number of experiments required for generating a model.

The present disclosure has been made considering the disadvantageous conventional technology. An object of the disclosure is to provide a means such as an estimation method that allows information indicating results of machining to be appropriately estimated.

An estimation method according to one aspect of the present disclosure is an estimation method executed by a processor using memory. This method includes the following four steps. First, the processor performs an experiment of machining a device to acquire first-type, second-type, third-type, and fourth-type information, where the first-type and second-type information each indicates conditions of the experiment of machining; and the third-type and fourth-type information each indicates a result of the experiment of machining. Second, the processor derives first and second expressions, where the first expression receives the first-type and second-type information as inputs and outputs the third-type information as more than one solution; and the second expression receives the first-type and second-type information as inputs and outputs the fourth-type information. Third, the processor derives more than one third expression from the first expression, where each of the more than one third expression receives the second-type and third-type information as inputs and outputs the first-type information. Finally, the processor receives the second-type and the third-type information each measured in machining the device as inputs and outputs the fourth-type information indicating a result of machining the device using the second expression and the more than one third expression.

According to the above aspect, the fourth-type information in machining can be estimated from the second-type and third-type information obtained in machining using a relational expression between the first-type, second-type, third-type, and fourth-type information obtained in experiment. During the process, when the first expression outputs the third-type information as more than one solution, the fourth-type information indicating results of machining can be appropriately estimated using the more than one third expression. In this way, the above estimation method allows information indicating results of machining to be appropriately estimated.

In outputting the fourth-type information for example, the processor may select single first-type information selected from more than one first-type information indicating conditions of machining the device that have been output from the more than one third expression. the processor may output the fourth-type information indicating the result of machining the device using the single first information selected.

According to the above aspect, single fourth-type information indicating results of machining can be appropriately estimated using more appropriate single first-type information selected from one or more first-type information to be obtained using more than one third expression. Accordingly, the above estimation method allows information indicating results of machining to be appropriately estimated.

For example, another method may be used that includes the following three steps. First, the processor may derive a fourth expression, where the fourth expression receives the first-type and second-type information as inputs, outputs the third-type information, and is a linear expression in the third-type information. Second, the processor may derive a fifth expression from the fourth expression, where the fifth expression receives the second-type and third-type information as inputs and outputs new first-type information. Finally, in outputting the fourth-type information, the processor may select the first-type information as the single first-type information from the more than one of pieces of first-type information indicating conditions of machining the device output from the more than one third expressions, where the selected first-type information has the least difference from the new first-type information having been output using the fifth expression with the second-type and third-type information measured in machining the device as inputs.

According to the above aspect, fourth-type information indicating results of machining can be appropriately estimated using single first-type information close to new first-type information having been output using the fifth expression, selected from one or more first-type information to be obtained using more than one third expression. The new first-type information having been output using the fifth expression typically has a relatively small difference from the true value. Thus, when one or more first-type information can be obtained from more than one third expression, first-type information relatively close to the true value can be obtained by selecting first-type information that has the least difference from the above new first-type information, which allows fourth-type information to be appropriately estimated. In this way, the above estimation method allows information indicating results of machining to be appropriately estimated.

In outputting the fourth-type information for example, the processor may select the first-type information from the more than one first-type information indicating conditions of machining the device having been output from the more than one third expression, where the selected first-type information is within a normal range. The processor may output the fourth-type information using the first-type information selected.

According to the above aspect, fourth-type information indicating results of machining can be appropriately estimated using single first-type information within the normal range and also more appropriate, selected from one or more first-type information obtained using more than one third expression. Accordingly, the above estimation method allows information indicating results of machining to be appropriately estimated.

In outputting the fourth-type information for example, if the more than one first-type information indicating conditions of machining having been output from the more than one third expression is an imaginary number, the processor may delete the imaginary part of the imaginary number. The processor may output the fourth-type information using the first-type information with its imaginary part deleted.

According to the above aspect, the imaginary part of an imaginary number is excluded from one or more first-type information obtained using more than one third expression to leave real numbers. Also, more appropriate single first-type information is used to allow fourth-type information indicating results of machining to be appropriately estimated. Accordingly, the above estimation method allows information indicating results of machining to be appropriately estimated.

To derive the more than one third expression for example, the processor may determine whether the first expression is a quadratic or higher polynomial expression on the third-type information and also is a polynomial expression that cannot be expressed by the n-th power of (a×x+b), where x is the third-type information. If the first expression is determined as a polynomial expression, the processor may derive the more than one third expression.

According to the above aspect, the determination based on a concrete form of the first expression allows fourth-type information to be appropriately estimated using more than one third expression. Accordingly, the above estimation method allows information indicating results of machining to be appropriately estimated more easily.

For example, the following conditions are allowed. That is, the first-type and fourth-type information is predetermined information as information not measured in the machining, and the second-type and third-type information is predetermined information as information measured in the machining.

According to the above aspect, if information indicating conditions of machining includes information not measured and also information indicating results of machining not measured includes information not measured, information indicating results of machining can be appropriately estimated. Accordingly, the above generation method allows a model that appropriately estimates information indicating results of machining to be generated even if information not measured is included.

For example, the following case is allowed. That is, the machining is laser welding, the first-type information includes the width of a gap between plate materials to be welded in the laser welding, the second-type information includes the scan rate of laser in the laser welding, the third-type information includes the surface weld width of a laser welded part in the laser welding, and the fourth-type information includes the interface weld width of the laser welded part in the laser welding.

The above aspect allows a model that appropriately estimates information indicating results of machining in laser welding to be generated more easily.

An estimation system according to one aspect of the present disclosure includes an acquisition unit that, after an experiment of machining a device, acquires first-type and second-type information each indicating conditions of the experiment of machining a device and third-type and fourth-type information each indicating a result of the experiment of machining; a derivation unit that derives a first expression and a second expression, where the first expression receives the first-type and second-type information as inputs and outputs the third-type information as more than one solution and the second expression receives the first-type and second-type information as input and outputs the fourth-type information, and also derives more than one third expression from the first expression, where each of more than one third expression receives the second-type and third-type information as inputs and outputs the first-type information using the first expression; and an estimation unit that receives the second-type and third-type information each having been measured in machining the device as input and outputs the fourth-type information indicating a result of the machining the device using the second expression and more than one third expression.

This provides the same advantage as that of the above estimation method.

These comprehensive or concrete aspects may be implemented by a system, device, integrated circuit, computer program, or recording medium (e.g., computer-readable CD-ROM), or any combination of these.

Hereinafter, concreate description is made of an embodiment with reference to the related drawings.

Note that each of the following embodiment describes comprehensive or concreate examples, and thus they present one example of aspects such as numeric values, shapes, materials, components, positions of components, connection forms of components, and steps and their sequence, and have no gist of limiting the scope of the disclosure. A component not described in an independent claim (describing the uppermost concept of the present disclosure) among the components according to the following embodiment is described as an optional component.

EMBODIMENT

In the following embodiment, a description is made of an estimation method and others that appropriately estimate information indicating results of machining.

First, the step of machining a device is described. Here, a description is made of the laser welding step in a manufacturing line as an example of machining a device, which does not limit the application of the embodiment.

The step of machining a device typically undergoes evaluation of the quality of the step. Evaluation of the quality is performed by evaluating information indicating the quality of machining the device, more concretely by evaluating physical quantities related to the quality of machining the device. The above physical quantities, however, are not always measured.

In the laser welding step in a manufacturing line for example, one index to evaluate the process quality may be bonding strength. If bonding strength is measured inline, it may help control to prevent defective products manufactured through the step.

Bonding strength, however, is substantially hard or impossible to be measured inline, and thus connection strength is forced to be evaluated from a bonding strength evaluation test performed offline.

Besides, bonding strength is correlated with an interface melted area between plate materials as a welding target, where the interface melted area can be calculated from an interface weld width and a weld distance. So, if the interface weld width between plate materials can be estimated, it helps evaluate the bonding strength. An interface weld width, however, is not measured inline in the present condition.

The system (also referred to as an estimation system) according to the embodiment estimates information indicating the quality of machining a device from measurable information selected from information indicating conditions of machining and selected from information indicating results of machining to allow the quality of machining a device to be evaluated. If information indicating the quality of machining a device is not measured directly, this method allows the information to be obtained by estimation.

Hereinafter, a description is made of how to generate a model that generates a model estimating information indicating the quality of machining a device from information indicating conditions of machining and information indicating results of machining and of how to estimate the above information using the above model.

FIG. 1 is an explanatory diagram of the configuration of system 1 according to the embodiment.

As shown in FIG. 1, system 1 is an estimation system that includes generation device 10 and estimation device 20. Estimation device 20 is connected with machining device 29.

Generation device 10 is a device that generates a model estimating information indicating results of machining a device. Generation device 10 generates a model (also referred to as an estimation model) that estimates information indicating results of machining a device based on information obtained through an experiment of machining a device by machining device 29. Generation device 10 provides the estimation model having been generated to estimation device 20. Generation device 10 executes the above process offline.

Estimation device 20 is a device that estimates information indicating results of machining a device. Estimation device 20 acquires information indicating conditions of machining a device and information indicating results of machining the device from machining device 29 and inputs the above information having been acquired to an estimation model to estimate information indicating results of machining the device. Estimation device 20 executes the above process inline.

Machining device 29 is a device that machines a device. Machining a device is concretely laser welding of a device or sputtering for example.

Figure 2:
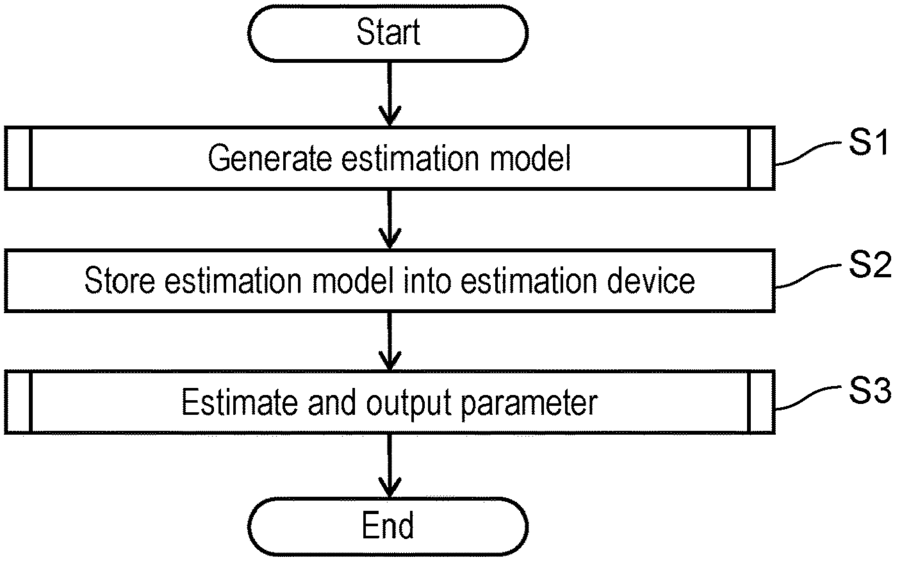
FIG. 2 is an explanatory diagram of the process of the system according to the embodiment.

FIG. 2 is an explanatory diagram of the process of system 1 according to the embodiment.

As shown in step S1 in FIG. 2, generation device 10 generates an estimation model offline that estimates information indicating results of machining a device. In this moment, generation device 10 generates the above estimation model using information obtained through an experiment of machining.

In step S2, generation device 10 stores the estimation model generated in step S1 into estimation device 20.

In step S3, estimation device 20 estimates inline information (parameter) indicating results of machining using the estimation model stored in step S2 and outputs the information. In this moment, estimation device 20 estimates the information using information obtained as a result of actually machining the device.

Hereinafter, a description is made of the configuration and the process of generation device 10 and estimation device 20.

Generation Device 10

Figure 3:
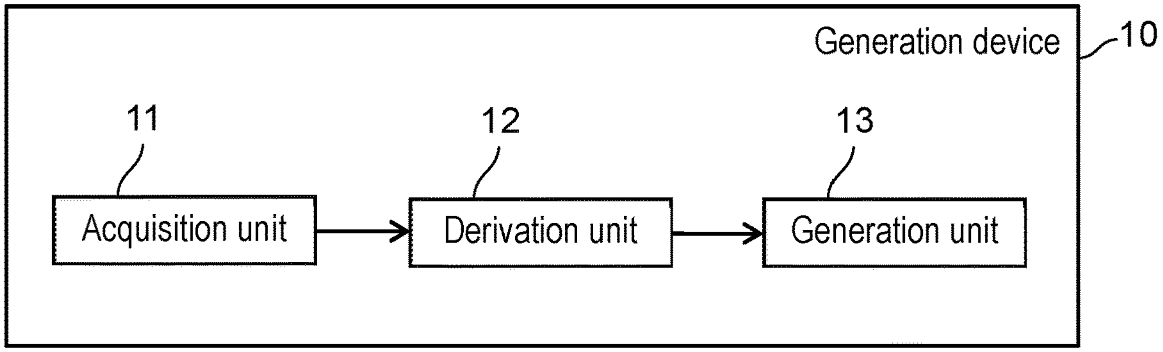
FIG. 3 is a block diagram of the functional configuration of a generation device according to the embodiment.

FIG. 3 is a block diagram of the functional configuration of generation device 10 according to the embodiment.

As shown in FIG. 3, generation device 10 includes acquisition unit 11, derivation unit 12, and generation unit 13 as function units. Generation device 10 can be implemented by a computer. A function unit included in generation device 10 can be implemented by a processor (e.g., a CPU (central processing unit), unillustrated) executing a program using memory (unillustrated) included in generation device 10.

Acquisition unit 11 is a function unit that, after an experiment of machining a device, acquires first and second parameters indicating conditions of machining and third and fourth parameters indicating results of machining. The first, second, third, and fourth parameters are also referred to as first-type, second-type, third-type, and fourth-type information, respectively. An experiment of machining a device is performed offline on the assumption of machining the device before actually machining the device. Examples of an experiment of machining a device include an actual machine experiment in which a step similar to the machining step in a manufacturing line is executed in another environment; or a simulation experiment in which a step that simulates the machining step in a manufacturing line is executed by computer simulation.

Here, to acquire the above parameters through an actual machine experiment, acquisition unit 11 may acquire results of the actual machine experiment performed on experimental equipment different from generation device 10 from the relevant device. On that occasion, acquisition unit 11 may control the above experimental equipment.

If acquisition unit 11 acquires the above parameters through a simulation experiment, acquisition unit 11 may execute a simulation experiment using computer resources (e.g., processor, memory) included in generation device 10.

Also, acquisition unit 11 acquires experimental design model 105 including the set of parameters used in the experiment. Experimental design model 105 is used for acquiring the third and fourth parameters.

Derivation unit 12 is a function unit that derives relationship between the first, second, third, and fourth parameters. Concretely, derivation unit 12 derives relationship (also referred to as first relationship) between the first, second, and third parameters. Also, derivation unit 12 derives relationship (also referred to as second relationship) between the first, second, and fourth parameters.

Here, the first relationship is expressed for example by a first statistical model expression (also referred to as a first expression) that receives first and second parameters as input and outputs a third parameter. The second relationship is expressed by a second statistical model expression (also referred to as a second expression) that receives first and second parameters as input and outputs a fourth parameter.

Generation unit 13 is a function unit that receives second and third parameters measured inline when machining device 29 actually machines a device as input, generates an estimation model that is a model estimating a fourth parameter indicating results of machining, and outputs the estimation model. Generation unit 13 estimates fourth information using the first and second relationship based on the estimation model.

When the first relationship is expressed by the first statistical model and the second relationship is expressed by the second statistical model expression, the estimation model includes a third statistical model expression (also referred to as a third expression). The third statistical model expression receives the second and third parameters derived from the first statistical model expression as input and outputs a first parameter.

The estimation model includes a second statistical model expression as well as a third statistical model expression. The estimation model includes a model that acquires a first parameter and a fourth parameter, where the first parameter is output by the third statistical model expression with the second and third parameters measured in machining as input and the fourth parameter is output by the second statistical model expression with the second parameter measured in machining as input.

Here, the first and second parameters may be predetermined information as information not measured in machining. The second and third parameters may be predetermined information as information measured in machining. Examples of information not measured in machining include information actually not measured due to constraints of cost or time required for measurement although the information can be measured in machining technologically. Information not measured in machining may include information technologically hard or impossible to be measured in machining.

Hereinafter, a description is made of how to generate an estimation model by derivation unit 12.

Figure 4:
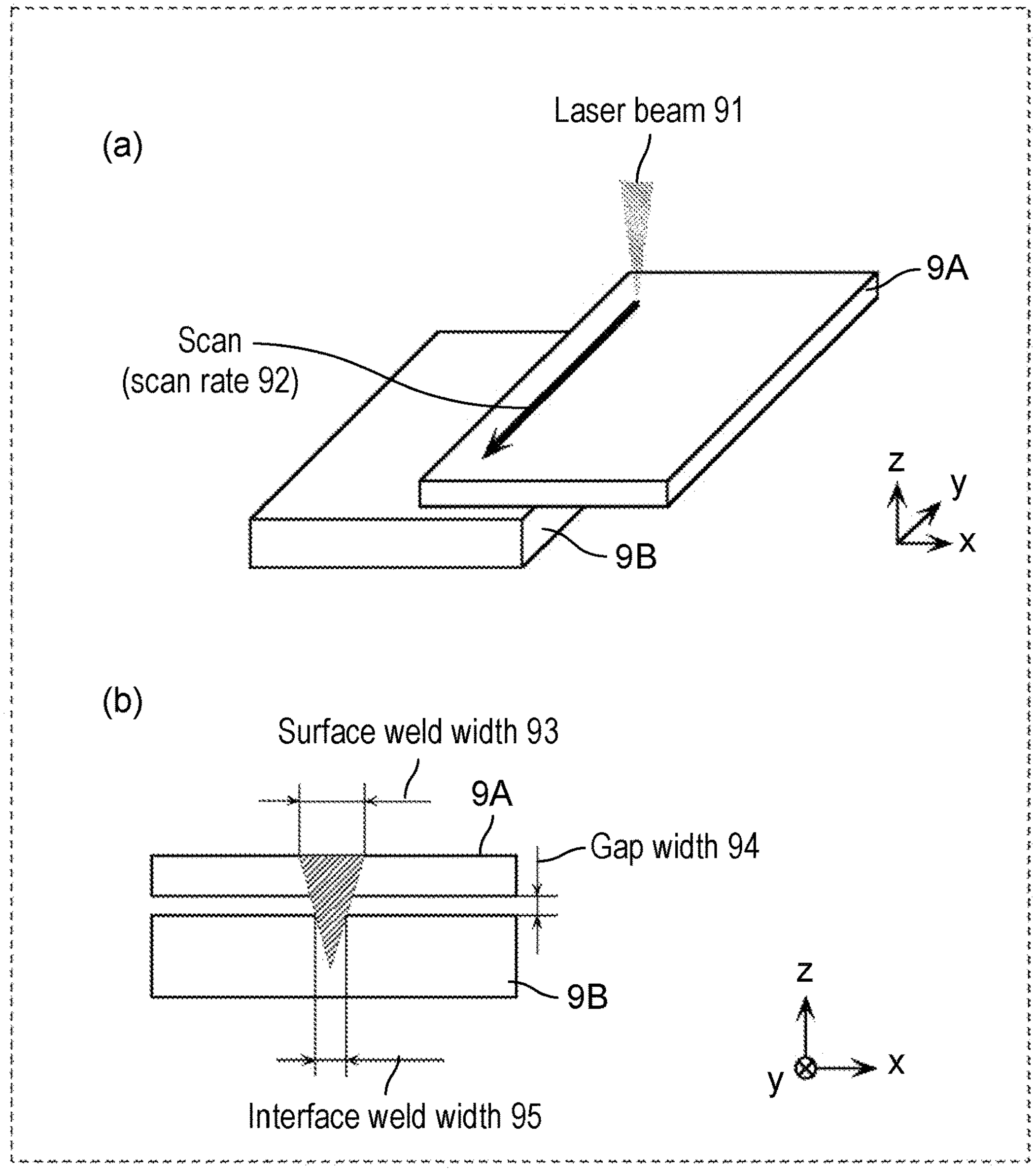
FIG. 4 is an explanatory diagram of parameters related to the laser welding step.
Figure 5:
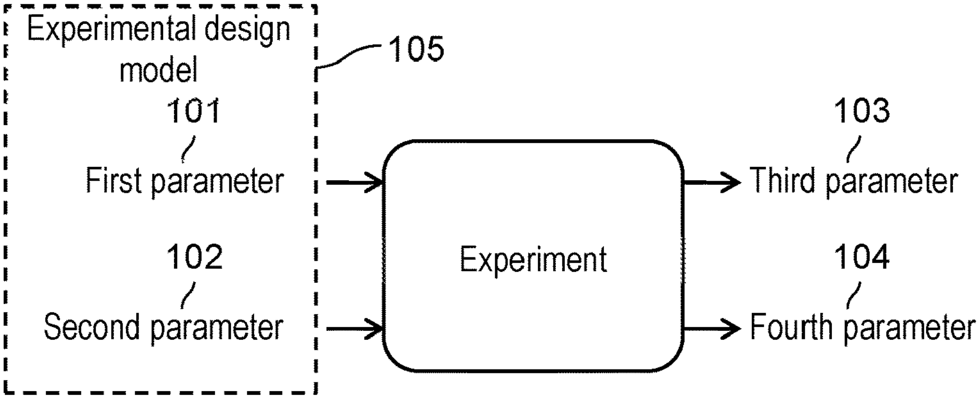
FIG. 5 is an explanatory diagram of the relationship between the first through fourth parameters in an experiment according to the embodiment.

FIG. 4 is an explanatory diagram of parameters related to the laser welding step. FIG. 5 is an explanatory diagram of the relationship between the first through fourth parameters in an experiment according to the embodiment. The first through fourth parameters are described with reference to FIGS. 4 and 5.

FIG. 4 (*a*) schematically shows the circumstances of the laser welding step in which machining device 29 welds plate materials 9A and 9B together by laser welding. As shown in FIG. 4 (*a*), plate materials 9A and 9B are disposed so that they partly overlap one another. Machining device 29 scan irradiates the region where plate materials 9A and 9B overlap one another with laser beam 91.

FIG. 4 (*b*) schematically shows a state of the cross section of plate materials 9A and 9B welded by laser welding by machining device 29. As shown in FIG. 4 (*b*), the part of plate materials 9A and 9B irradiated with laser beam 91 is welded. Of the welded part of plate materials 9A and 9B, the width on the top surface (i.e., the surface viewed from the positive direction of z axis) of plate material 9A is referred to as surface weld width 93. The width on the interface of plate materials 9A and 9B is also referred to as interface weld width 95. Between plate materials 9A and 9B, there is a minute gap with gap width 94.

Next, a description is made of first parameter 101 through fourth parameter 104 and experimental design model 105 used for generating an estimation model with reference to FIG. 5.

First parameter 101 is a parameter indicating conditions of machining and is not measured inline due to constraints of cost or time. First parameter 101 is a parameter needed for highly accurately estimating information indicating results of machining.

First parameter 101 includes gap width 94, for example, between plate materials 9A and 9B as a welding target. Gap width 94 is controllable by using a jig for an offline experiment, and by setting simulation conditions for an experiment by simulation.

Second parameter 102 is a parameter indicating conditions of machining and is measured inline. Second parameter 102 includes scan rate 92 of laser for example.

Experimental design model 105 is information that includes parameters (first parameter 101 and second parameter 102) to be used in an experiment. Experimental design model 105 is a model having been generated based on the upper limit and the lower limit (the limits are set in advance) of possible values of first parameter 101 and second parameter 102 in an experiment. Experimental design model 105 includes setting information of possible values (also referred to as an experimental point condition) of first parameter 101 and second parameter 102 in an experiment. Third parameter 103 and fourth parameter 104 are output as a result of executing an experiment under first parameter 101 and second parameter 102 that have been set according to the experimental point condition indicated by experimental design model 105.

Third parameter 103 is information indicating results of machining and is measured inline. Third parameter 103 includes surface weld width 93 of a laser welded part for example.

Fourth parameter 104 is information indicating results of machining and is not measured inline due to constraints of cost or time. Fourth parameter 104 is a characteristic parameter related to the quality of machining. Fourth parameter 104 includes interface weld width 95 at the interface between plate materials 9A and 9B of a laser welded part for example. To measure interface weld width 95 directly, the processed item is cut off offline and its section is measured for example; such measurement is hard or impossible inline.

Next, a description is made of the first through third statistical model expressions and an estimation model.

Figure 6:
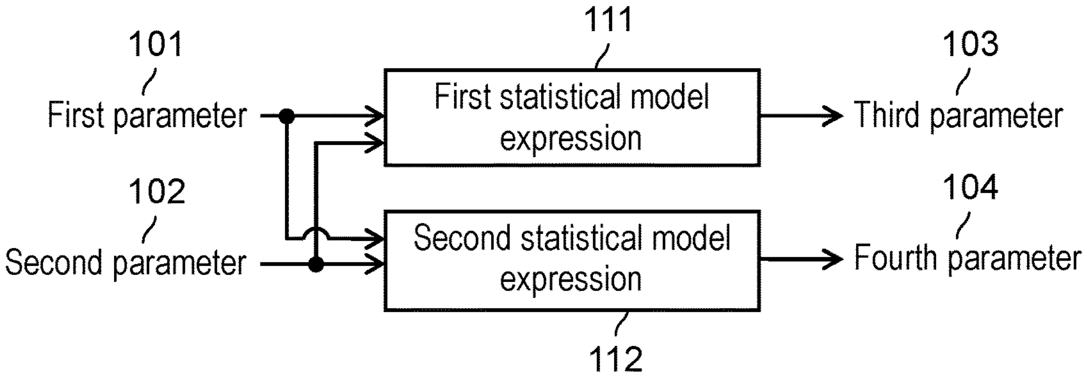
FIG. 6 is an explanatory diagram of the relationship between the first through fourth parameters, and the first and second statistical model expressions, derived by the generation device according to the embodiment.
Figure 7:
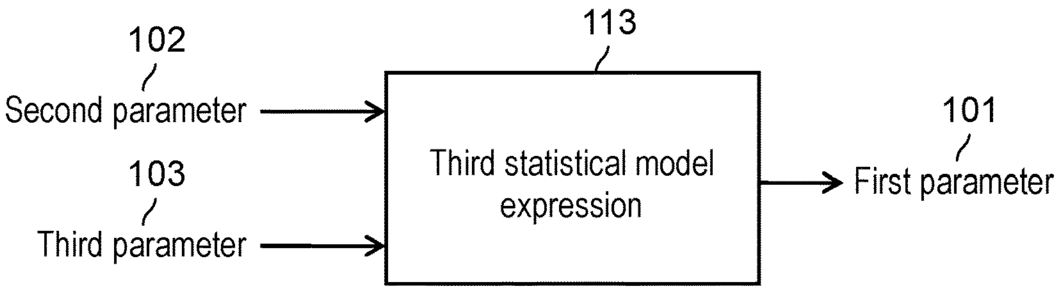
FIG. 7 is an explanatory diagram of the relationship between the first through third parameters, and the third statistical model expression, derived by the generation device according to the embodiment.
Figure 8:
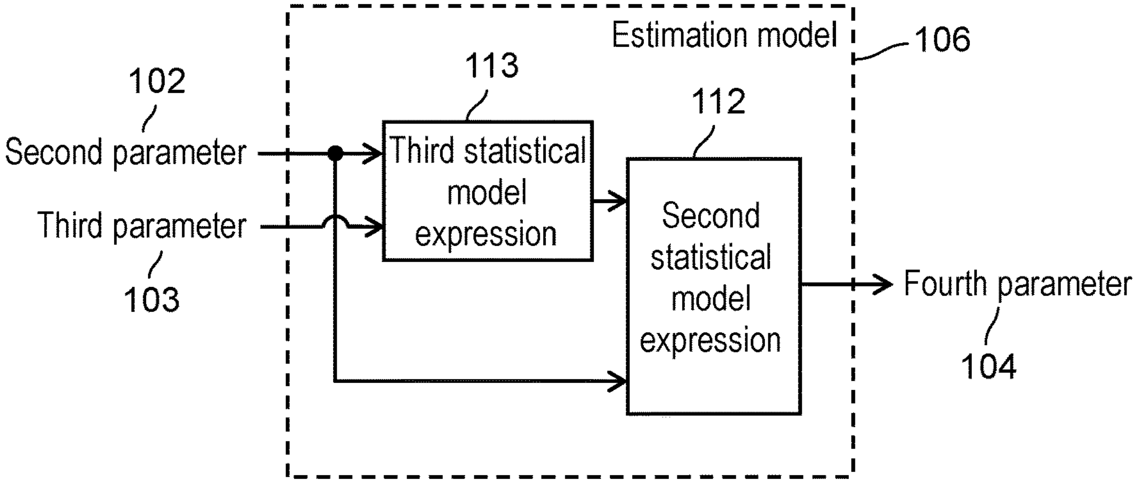
FIG. 8 is an explanatory diagram of an estimation model generated by the generation device according to the embodiment.

FIG. 6 is an explanatory diagram of the relationship between the first through fourth parameters, and the first and second statistical model expressions, derived by generation device 10 according to the embodiment. FIG. 7 is an explanatory diagram of the relationship between the first through third parameters, and the third statistical model expression, derived by generation device 10 according to the embodiment. FIG. 8 is an explanatory diagram of an estimation model generated by generation device 10 according to the embodiment.

Derivation unit 12 derives first statistical model expression 111 and second statistical model expression 112 using the set of first parameter 101 through fourth parameter 104 obtained through an experiment, by statistical modeling based on experimental design model 105. Here, first statistical model expression 111 is a model expression with first parameter 101 and second parameter 102 being input variables (explanatory variable) and with third parameter 103 being an output variable (objective variable). Second statistical model expression 112 is a model expression with first parameter 101 and second parameter 102 being input variables (explanatory variable) and with fourth parameter 104 being an output variable (objective variable).

In other words, first statistical model expression 111 and second statistical model expression 112 can be expressed by the following form as shown by expression 1 (refer to FIG. 6).

First statistical model expression 111: $P_3=f_1(P_1,P_2)$

Second statistical model expression 112: $P_4=f_2(P_1,P_2)$ (expression 1)

$P_1$ is a first parameter; $P_2$, second parameter; $P_3$, third parameter; and $P_4$, fourth parameter.

Here, what is used for evaluating a step is fourth parameter 104 that is an objective variable; fourth parameter 104 is a parameter that is not measured inline, and thus second statistical model expression 112 is to be used for estimation.

However, first parameter 101, one input variable for second statistical model expression 112, is as well a parameter that is not measured inline, and thus first parameter 101 also needs to be estimated.

Thus, first statistical model expression 111 is used for estimating first parameter 101. For first statistical model expression 111, first parameter 101 and second parameter 102 are input variables and third parameter 103 is an output variable. By solving first statistical model expression 111 as an algebraic equation with first parameter 101 being an unknown, first statistical model expression 111 can be converted to an expression with second parameter 102 and third parameter 103 being input variables and with first parameter 101 being an output variable.

Derivation unit 12 obtains an expression (corresponding to third statistical model expression 113, refer to expression 2) converted in this way (refer to FIG. 7).

$$\text{Third statistical model expression 113: } P_1 = f_1^{-1}(P_2, P_3) \quad \text{(expression 2)}$$

Here, derivation unit 12 performs determination on first statistical model expression 111 and outputs third statistical model expression 113 as described below.

If derivation unit 12 determines as first statistical model expression 111 is a linear expression on the first parameter, derivation unit 12 derives a third parameter as a single solution and outputs third statistical model expression 113 that is a single linear expression.

Besides, if derivation unit 12 determines also as first statistical model expression 111 is an expression that can be expressed by the n-th power of (a×x+b), where x is a first parameter and n is an integer of 2 or more, same hereinafter), derivation unit 12 derives a third parameter as a single solution and outputs third statistical model expression 113 that is a single linear expression.

Meanwhile, if derivation unit 12 determines as first statistical model expression 111 is a quadratic or higher expression and is also an expression that cannot be expressed by the n-th power of (a×x+b), derivation unit 12 derives a third parameter as more than one solution and outputs more than one third statistical model expression 113 that is a linear expression on the third parameter. In this case, derivation unit 12 can also output single third statistical model expression 113 that is a linear expression on the third parameter, besides the set including more than one third statistical model expression 113 that is a linear expression on the third parameter. In such a case, a value derived by single third statistical model expression 113 can also be handled as a first parameter. A first parameter derived by single third statistical model expression 113 has a relatively small difference from the true value; however, the first parameter may have a larger difference from the true value than that derived by more than one third statistical model expression 113 included in the above set.

Thus, first parameter 101 is calculated by third statistical model expression 113 that includes second parameter 102 and third parameter 103.

Then, expression 2 is substituted for first parameter 101 in second statistical model expression 112 of expression 1 (that is, both first parameter 101 and second parameter 102 are input variables) to allow fourth parameter 104 to be estimated using second statistical model expression 112.

In other words, fourth parameter 104 can be expressed by the following form shown as expression 3 (refer to FIG. 8).

$$P_4 = f_2(f_1^{-1}(P_2, P_3), P_2) \quad \text{(expression 3)}$$

A model that can thus output fourth parameter 104 when second parameter 102 and third parameter 103 have been input is also referred to as estimation model 106.

Accordingly, if second parameter 102 and third parameter 103 acquired through inline measurement are input to estimation model 106, fourth parameter 104 can be estimated as information indicating results of machining that is a target of inline measurement.

A description is made of the process of generation device 10 configured as above.

Figure 9:
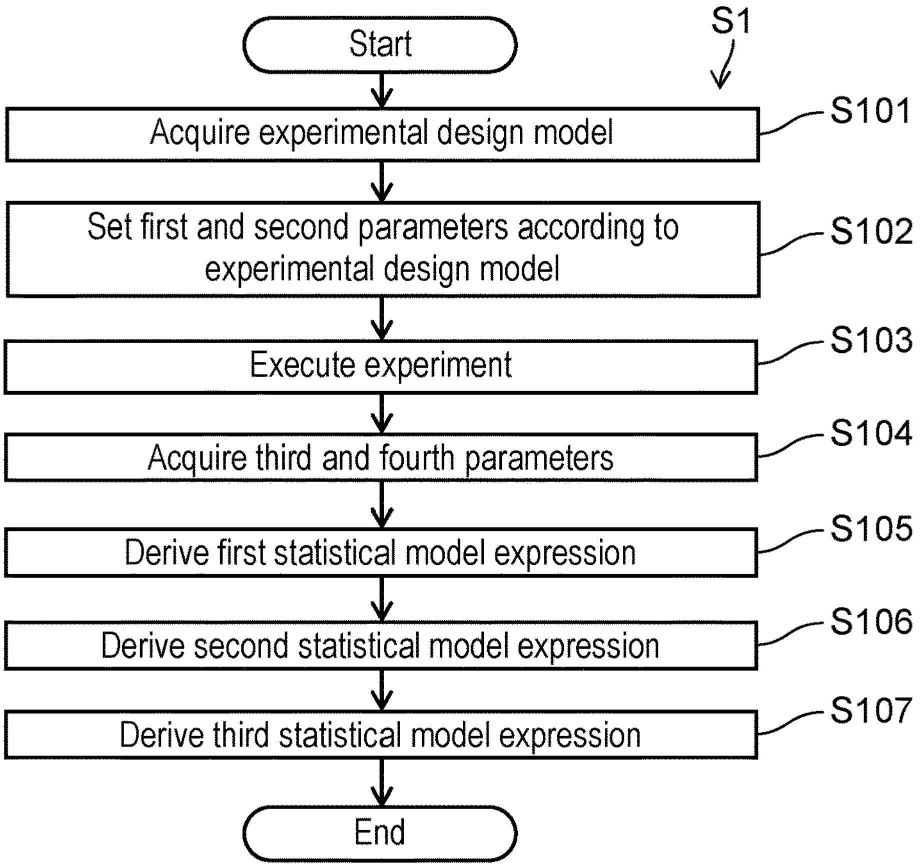
FIG. 9 is a flowchart showing the process executed by the generation device according to the embodiment.
Figure 10:
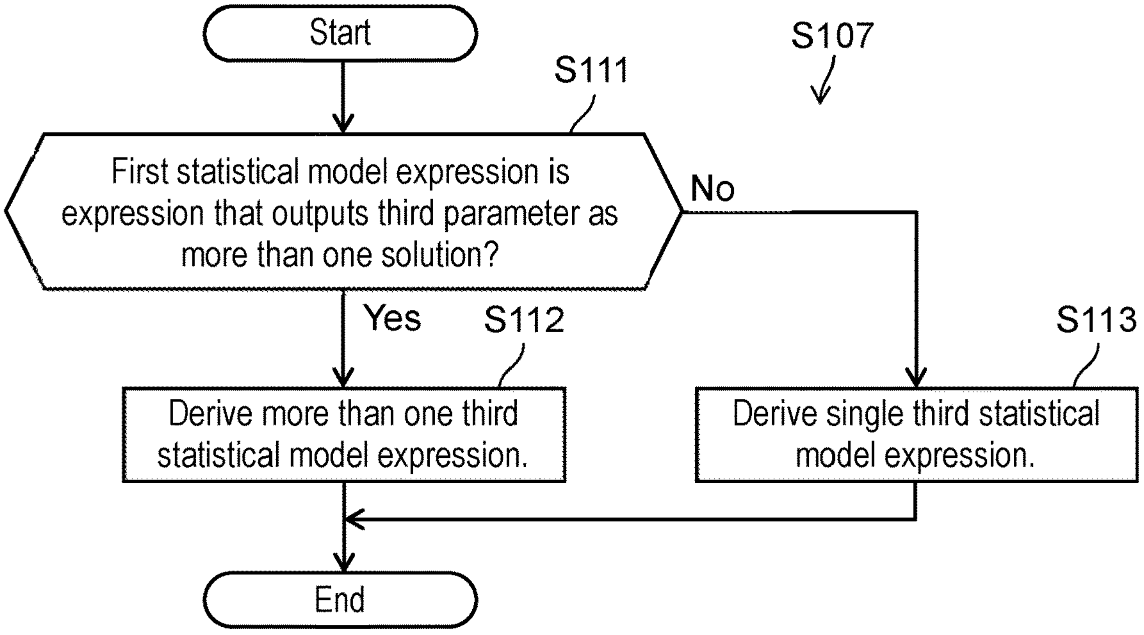
FIG. 10 is a flowchart showing the detailed process executed by the generation device according to the embodiment.

FIG. 9 is a flowchart showing the process executed by generation device 10 according to the embodiment. FIG. 10 is a flowchart showing the detailed process executed by generation device 10 according to the embodiment.

The process shown in FIG. 9 is that included in step S1 in FIG. 2. The process shown in FIG. 10 is that included in step S107 in FIG. 9.

As shown in FIG. 9, acquisition unit 11 acquires experimental design model 105 in step S101.

In step S102, acquisition unit 11 sets first and second parameters used in an experiment based on experimental design model 105 acquired in step S101.

In step S103, acquisition unit 11 executes the experiment using the first and second parameters set in step S102.

In step S104, acquisition unit 11 acquires third and fourth parameters that are output as results of the experiment executed in step S103.

In step S105, derivation unit 12 derives a first statistical model expression using the first and second parameters set in step S102 and the third parameter acquired in step S104.

In step S106, derivation unit 12 derives a second statistical model expression using the first and second parameters set in step S102 and the fourth parameter acquired in step S104.

In step S107, derivation unit 12 derives a third statistical model expression using the first statistical model expression derived in step S105 and the second statistical model expression derived in step S106.

In this moment, derivation unit 12 executes a separate process in response to whether the first statistical model expression is an expression that derives a third parameter as a single solution or as more than one solution.

In other words, in step S111 (refer to FIG. 10), derivation unit 12 determines whether the first statistical model expression is an expression that outputs a third parameter as more than one solution. If the first statistical model expression is determined as an expression that outputs a third parameter as more than one solution (Yes in step S111), the process flow proceeds to step S112; otherwise (No in step S111), to step S113.

In step S112, derivation unit 12 modifies the first statistical model expression to derive more than one third statistical model expression.

In step S113, derivation unit 12 modifies the first statistical model expression to derive a single third statistical model expression.

The third statistical model expression thus derived by derivation unit 12 in step S112 or step S113 becomes a third statistical model expression derived in step S107 (refer to FIG. 9).

Estimation Device 20

Next, estimation device 20 is described.

Figure 11:
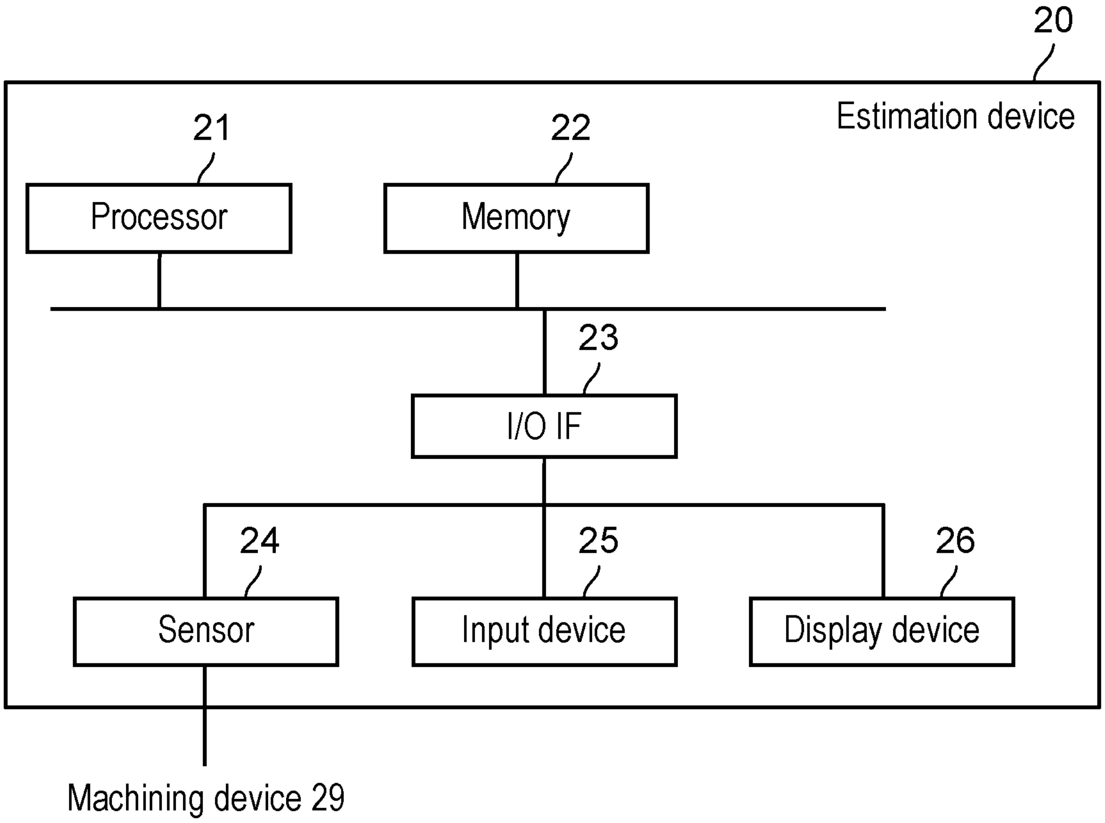
FIG. 11 is a block diagram of the hardware configuration of an estimation device according to the embodiment.

FIG. 11 is a block diagram of the hardware configuration of estimation device 20 according to the embodiment.

Estimation device 20, implemented by a computer for example, includes processor 21, memory 22, I/O IF 23, sensor 24, input device 25, and display device 26.

Processor 21 is an arithmetic unit that performs the parameter estimation process and is a CPU for example.

Memory 22 is a storage device that stores programs and data and is a RAM (random access memory) for example. Memory 22 stores estimation model 106 generated by generation device 10.

I/O IF 23 is an interface device that mutually transfers data between processor 21, memory 22, sensor 24, input device 25, and display device 26. I/O IF 23 is connected to these devices, where the connection is wired, wireless, or both combined.

Sensor 24 is disposed in machining device 29 that is a target of inline measurement. Machining device 29 is a laser welding device for example. Sensor 24 is a laser displacement gage for example that measures surface weld width 93 (refer to FIG. 4 (*b*)) of a plate material that is a welding target.

Input device 25 is a device that receives input of information related to first through fourth parameters and is a keyboard or touch panel for example.

Display device 26 is a device that indicates information related to first through fourth parameters and is an LCD (liquid crystal display) monitor for example.

Figure 12:
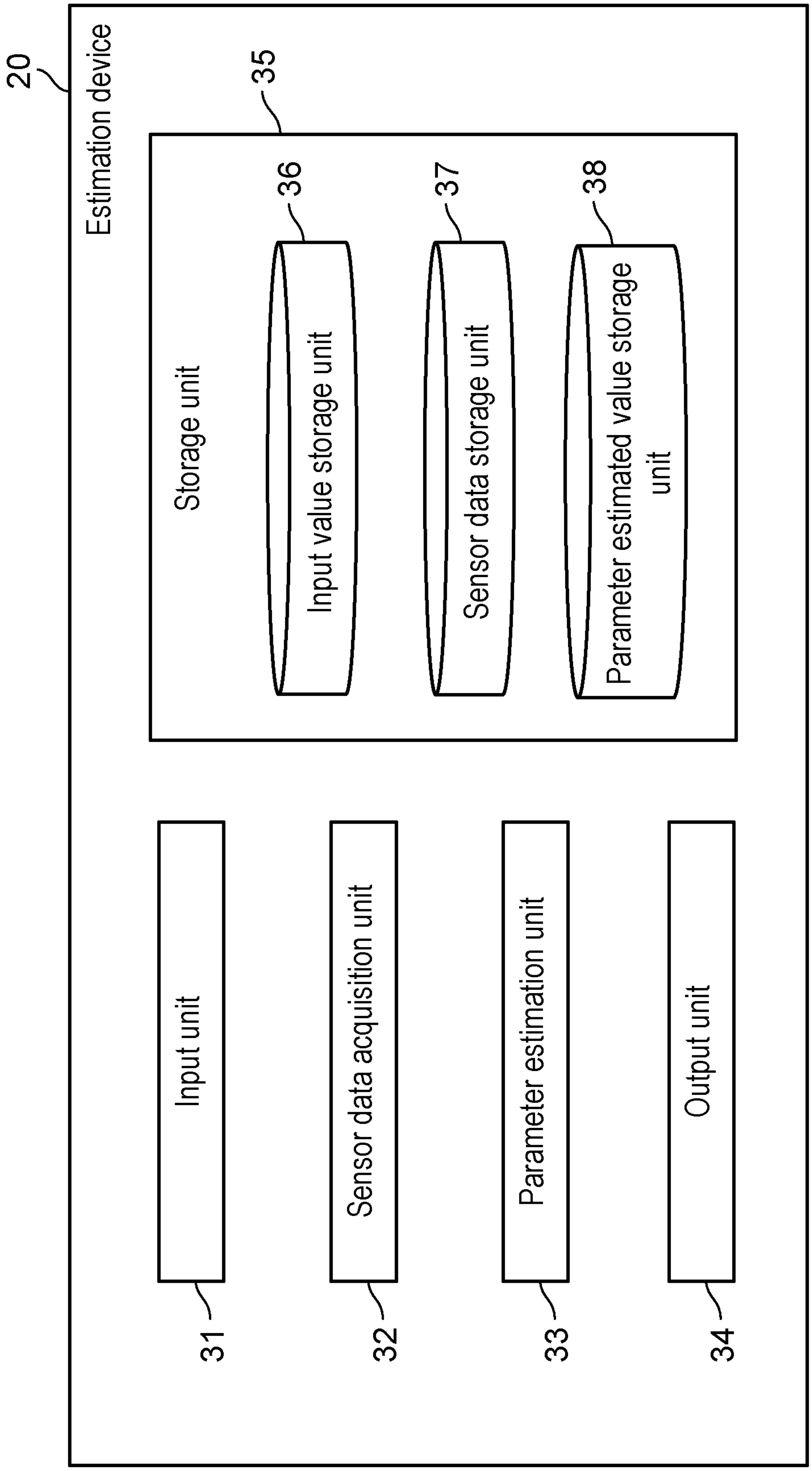
FIG. 12 is a block diagram of the functional configuration of the estimation device according to the embodiment.

FIG. 12 is a block diagram of the functional configuration of estimation device 20 according to the embodiment.

As shown in FIG. 12, estimation device 20 includes input unit 31, sensor data acquisition unit 32, parameter estimation unit 33, output unit 34, and storage unit 35 as the functional configuration.

Input unit 31 is a function unit that receives input of determination value information such as specifications about first parameter 101, second parameter 102, third parameter 103, and fourth parameter 104, from a user through input device 25. The input is executed when the model of machining device 29 is changed for example, but not limited to this timing. A value having been input here is registered into input value storage unit 36 of storage unit 35.

Sensor data acquisition unit 32 is a function unit that acquires measured data of second parameter 102 and third parameter 103 from sensor 24 connected to machining device 29. Second parameter 102 is scan rate 92 (refer to FIG. 4 (*a*)) for example. Third parameter 103 is surface weld width 93 (refer to FIG. 4 (*b*)) of a plate material as a welding target for example. The frequency of acquiring data can be freely set. In the subsequent parameter estimation, however, data acquired in succession may be used on an as-needed basis. Alternatively, the average value of data acquired twice or more for one workpiece may be used as a measure of the central tendency of the workpiece. The data acquired is recorded into sensor data storage unit 37. Besides, the data acquired is determined whether it conforms to a determination condition stored in input value storage unit 36. If it does not conform, quality information indicating no good (NG) is output. The determination condition is a condition representing specifications or a normal range for example.

Parameter estimation unit 33 inputs second parameter 102 and third parameter 103 recorded in sensor data storage unit 37 into estimation model 106 (i.e., using the above expression 3), calculates fourth parameter 104, and outputs fourth parameter 104 for estimation. In this moment, if the first statistical model expression is an expression that derives a third parameter as a single solution, parameter estimation unit 33 receives second parameter 102 and single third parameter 103 as input and outputs fourth parameter 104 using the second statistical model expression and the single third statistical model expression.

If the first statistical model expression is an expression that derives a third parameter as more than one solution, parameter estimation unit 33 receives second parameter 102 and more than one third parameter 103 as input and outputs fourth parameter 104 using the second statistical model expression and the more than one third statistical model expression (described later). Fourth parameter 104 is interface weld width 95 (refer to FIG. 4 (*b*)) between plate materials for example. The estimated value of fourth parameter 104 having been output is recorded into parameter estimated value storage unit 38.

In outputting fourth parameter 104, parameter estimation unit 33 may select single first parameter 101 from more than one first parameter 101 indicating conditions of machining a device that have been output using each of more than one third statistical model expression to output a fourth parameter indicating results of machining the device using single first parameter 101 selected.

In outputting fourth parameter 104, first parameter 101 may be selected as single first parameter 101, where first parameter 101 has the least difference from new first parameter 101 having been output using the fifth statistical model expression with second parameter 102 and third parameter 103 measured in machining the device as input, selected from more than one first parameter 101 indicating conditions of machining the device having been output using each of more than one third statistical model expression. Here, the following is assumed. That is, a statistical model expression (also referred to as a fourth statistical model expression or a fourth expression) is derived, where the statistical model expression receives first parameter 101 and second parameter 102 as input, outputs third parameter 103, and is a linear expression on third parameter 103. Besides, another statistical model expression (also referred to as a fifth statistical model expression or a fifth expression) is derived, where the statistical model expression receives second parameter 102 and third parameter 103 as input and outputs new first parameter 101 using the fourth statistical model expression.

In outputting fourth parameter 104, another first parameter 101 within the normal range may be selected from more than one first parameter 101 indicating conditions of machining a device having been output using each of the more than one third statistical model expression to output fourth parameter 104 using first parameter 102 selected.

In outputting fourth parameter 104, if the more than one first parameter 101 indicating conditions of machining a device having been output using each of the more than one third statistical model expression is an imaginary number, the imaginary part of the imaginary number may be deleted to output fourth parameter 104 using first parameter 101 with its imaginary part deleted.

The estimated value of fourth parameter 104 having been output is determined whether it conforms to a determination condition stored in input value storage unit 36. If it does not conform, quality information indicating no good (NG) is output. The determination condition is a condition representing specifications or a normal range for example.

Output unit 34 is a function unit that outputs data recorded in storage unit 35 or determination results. Output unit 34 for example displays the above data onto display device 26 for outputting. Output unit 34 may output the data audibly or transmit the data to another device through communications for outputting.

Storage unit 35 is a function unit that stores various types of values and data. Storage unit 35 includes input value storage unit 36, sensor data storage unit 37, and parameter estimated value storage unit 38. Storage unit 35 composed of the above function units stores values or data, and the values or data are read from storage unit 35.

Figure 13:
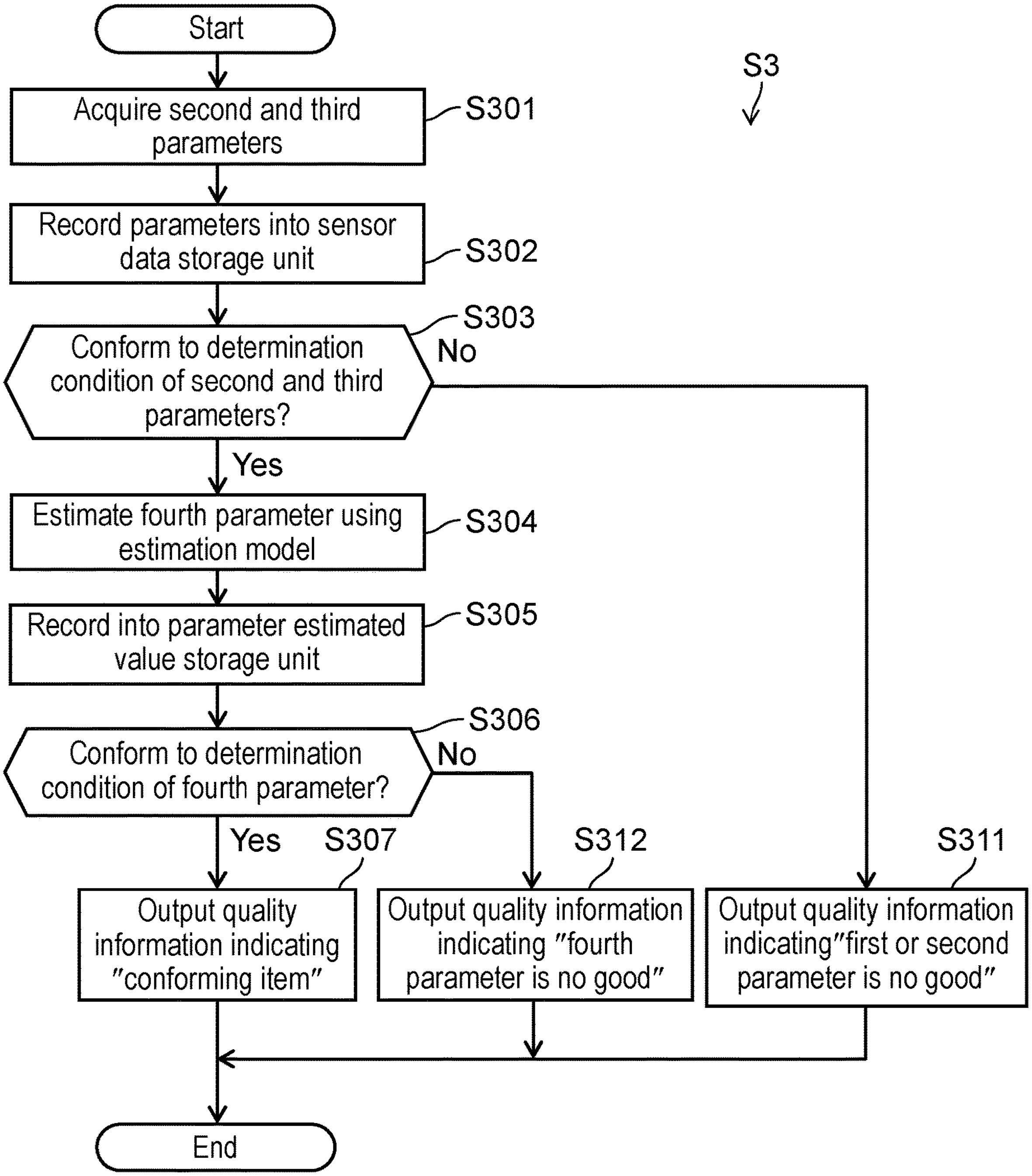
FIG. 13 is a flowchart showing the process executed by the estimation device according to the embodiment.

FIG. 13 is a flowchart showing the process executed by estimation device 20 according to the embodiment. The process shown in FIG. 13 is that included in step S3 in FIG. 2.

In step S301, sensor data acquisition unit 32 acquires measured data of second parameter 102 and third parameter 103 from sensor 24.

In step S302, sensor data acquisition unit 32 stores measured data acquired in step S301 into sensor data storage unit 37.

In step S303, sensor data acquisition unit 32 determines whether or not the measured data acquired in step S301 conforms to a determination condition. If conforming to the determination condition (Yes in step S303), step S304 is executed; otherwise (No in step S303), step S311 is executed.

In step S304, parameter estimation unit 33 inputs second parameter 102 and third parameter 103 that are measured data recorded in sensor data storage unit 37 into estimation model 106 (in other words, using the above expression 3) to estimate fourth parameter 104. The process in step S304 is later described in detail.

In step S305, parameter estimation unit 33 stores fourth parameter 104 estimated in step S304 into parameter estimated value storage unit 38.

In step S306, parameter estimation unit 33 determines whether or not fourth parameter 104 estimated in step S304 conforms to a determination condition. If conforming to the determination condition (Yes in step S306), step S307 is executed; otherwise (No in step S306), step S312.

In step S307, output unit 34 outputs quality information indicating a conforming item (OK).

In step S311, output unit 34 outputs quality information indicating no good (NG) based on the fact that second parameter 102 or third parameter 103 does not conform to the determination condition.

In step S312, output unit 34 outputs quality information indicating no good (NG) based on the fact that fourth parameter 104 does not conform to the determination condition.

After the process of step S307, S311, or S312 is completed, a series of processes shown in FIG. 13 ends.

Hereinafter, a description is made of the detailed process included in above step S304.

Figure 14:
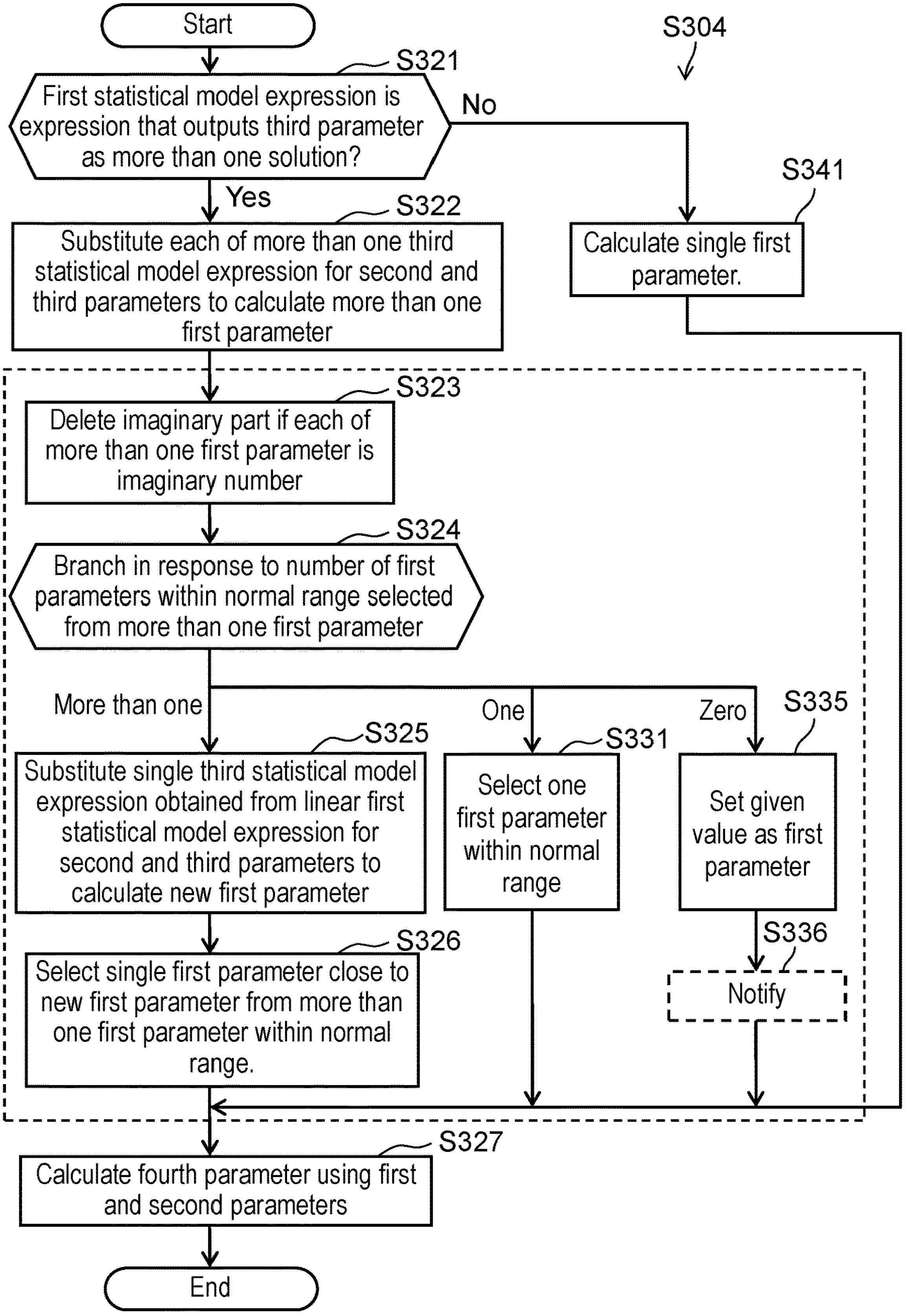
FIG. 14 is a flowchart showing the detailed process executed by the estimation device according to the embodiment.

FIG. 14 is a flowchart showing the detailed process executed by estimation device 20 according to the embodiment.

In step S321, parameter estimation unit 33 determines whether or not the first statistical model expression is an expression that derives a third parameter as more than one solution. If the first statistical model expression is determined as an expression that outputs a third parameter as more than one solution (Yes in step S321), the process flow proceeds to step S322; otherwise (No in step S321), to step S341.

If the first statistical model expression is determined as an expression that outputs a third parameter as more than one solution, more than one third statistical model expression has been derived by derivation unit 12 in advance. If the first statistical model expression is determined as not an expression that outputs a third parameter as more than one solution, a single third statistical model expression has been derived from derivation unit 12 in advance.

In step S322, parameter estimation unit 33 substitutes second parameter 102 and third parameter 103 that are measured data recorded in sensor data storage unit 37 for each of more than one third statistical model expression to calculate more than one first parameter.

In step S323, parameter estimation unit 33 determines whether or not each of more than one first parameter calculated in step S322 is an imaginary number. If an imaginary number, the imaginary part of the imaginary number is deleted to provide a real number. Here, deleting the imaginary part of more than one first parameter may provide an identical number. As a result, one or more first parameters exist after the process of step S323 has been executed.

In step S324, parameter estimation unit 33 determines the number of first parameters within the normal range is more than one, one, or zero, selected from more than one first parameter (if an imaginary part has been deleted in step S323, one or more first parameters after the imaginary part have been deleted) calculated in step S322, and the subsequent process branches in response to the determination result. If the number of first parameters within the normal range is determined as more than one ("more than one" in step S324), the process flow proceeds to step S325; one ("one" in step S324), to step S331; and zero ("zero" in step S324), to step S335.

In step S325, parameter estimation unit 33 substitutes the single third statistical model expression obtained from a linear first statistical model expression on the third parameter for the second and third parameters to calculate a new first parameter.

In step S326, parameter estimation unit 33 selects a single first parameter that is closer to the new first parameter calculated in step S325 from more than one first parameter (if an imaginary part has been deleted in step S323, more than one first parameter after the imaginary part has been deleted) calculated in step S322.

In step S331, parameter estimation unit 33 selects one first parameter within the normal range. After step S331 is completed, the process flow proceeds to step S327.

In step S335, parameter estimation unit 33 sets a given value as the first parameter.

In step S336, parameter estimation unit 33 may notify a user. The notice may be one that indicates there is no first parameter within the normal range or that indicates a given value has been set as the first parameter. After step S336 is completed, the process flow proceeds to step S327.

In step S341, parameter estimation unit 33 substitutes the single third statistical model expression for second parameter 102 and third parameter 103 that are measured data recorded in sensor data storage unit 37 to calculate a single first parameter.

In step S327, parameter estimation unit 33 uses the first parameter and second parameter 102 that is measured data recorded in sensor data storage unit 37 to calculate a fourth parameter by second statistical model expression 112. The above first parameter is a single first parameter selected in step S326 or S331, the first parameter having been set in step S335, or the first parameter calculated in step S341.

The above description is made, as an example, of a case where a single first parameter is calculated if the first statistical model expression is an expression that outputs a third parameter as more than one solution, and then a single fourth parameter is calculated using the single first parameter. In this case, however, instead of calculating a single first parameter, more than one fourth parameter may be calculated using more than one first parameter. These processes correspond to a series of processes shown in FIG. 14 excluding steps S323 to S326, S331, and steps S335 to S336 (in other words, those enclosed by the broken-line frame).

A series of processes shown in FIGS. 13 and 14 allows the following inline estimation for example. In the laser welding step, interface weld width 95 between plate materials can be estimated inline based on data measured inline such as scan rate 92 of laser or surface weld width 93 of a laser welded part. An attempt to actually measure interface weld width 95 requires observing a cross-section shape offline; however, interface weld width 95 can be advantageously estimated inline.

Hereinafter, a description is made of an example of the accuracy in estimation by an estimation model according to the embodiment. Concretely, a description is made of (1) the accuracy in estimation by an estimation model according to the embodiment and (2) the validity of a single parameter selected from more than one first parameter.

(1) Accuracy in Estimation by an Estimation Model According to the Embodiment

Figure 15:
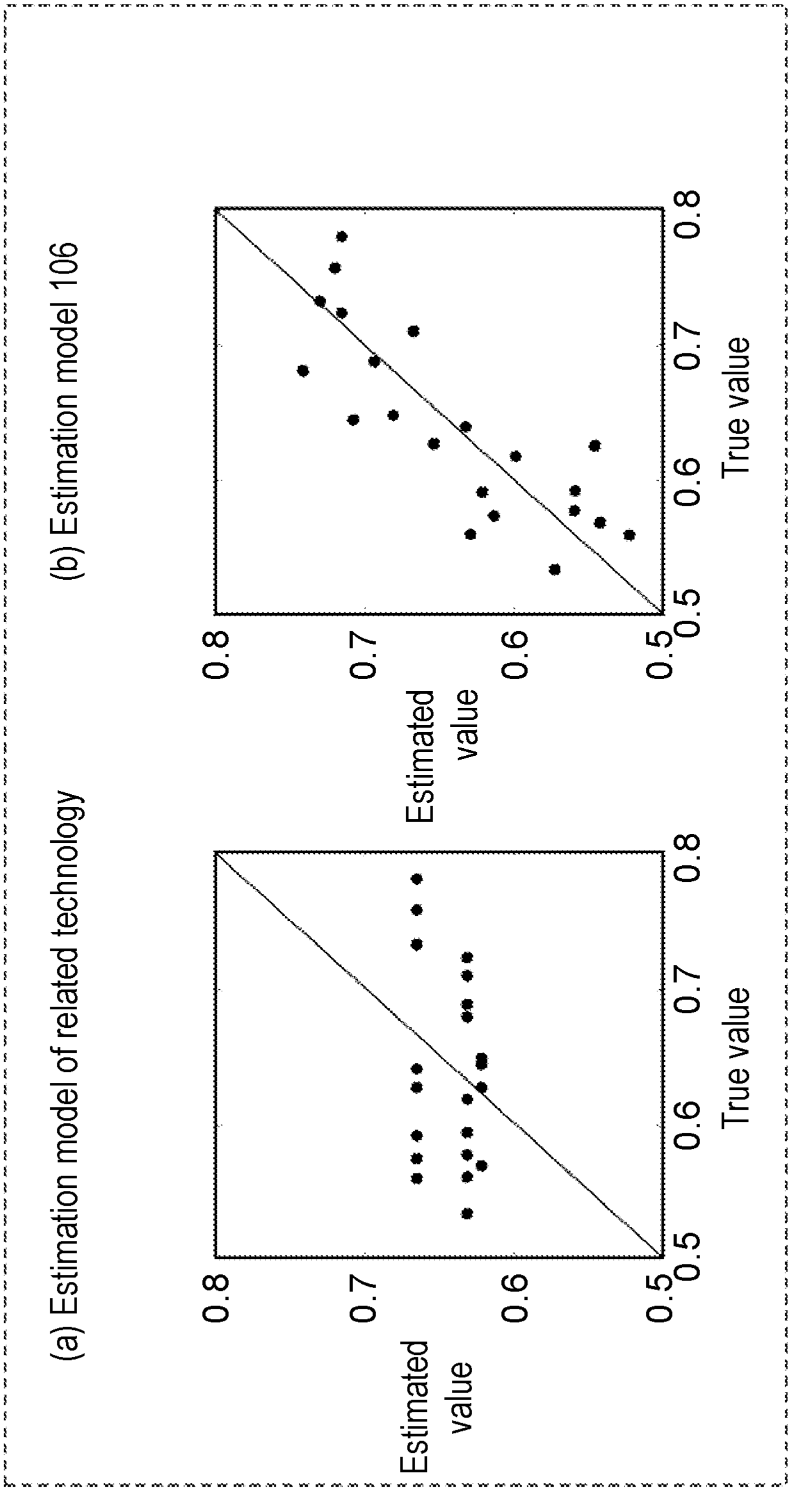
FIG. 15 is an explanatory diagram of the accuracy in estimation by the estimation model according to the embodiment, in comparison with related technologies.

FIG. 15 is an explanatory diagram of the accuracy in estimation by the estimation model according to the embodiment in comparison with related technologies.

FIG. 15 (*a*) is a graph created by plotting fourth parameters estimated using an estimation model according to the related technology with true values on the horizontal axis and with estimated values on the vertical axis. Here, the related technology refers to a technology that uses an estimation model (different from estimation model 106 according to the embodiment) estimating a fourth parameter by inputting a fixed value corresponding to a first parameter and a second parameter acquired through inline measurement into a second statistical model expression.

FIG. 15 (*b*) is a graph created by plotting fourth parameters estimated using estimation model 106 according to the embodiment with true values on the horizontal axis and with estimated values on the vertical axis.

The RMSE (root mean squared error) between true values and estimated values is 0.0625 for the related technology; and 0.0415, for the embodiment. The estimation accuracy of the embodiment proves higher than that of the related technology by 30% or more.

In this way, even if an explanatory variable includes a parameter not collected inline as measured data, a parameter of an objective variable can be estimated with a small number of experiments.

(2) The Validity of a Single Parameter Selected from More than One First Parameter FIGS. 16 and 17 are explanatory diagrams indicating the validity of a single first parameter selected according to the embodiment.

Here, a description is made, using concrete values, of a process in which, if the first statistical model expression is a quadratic expression on a first parameter, a single first parameter is selected from the second and third parameters measured for evaluation and one or more first parameters calculated using the third statistical model expression.

FIG. 16 shows second and third parameters measured for evaluation and two first parameters calculated using the third statistical model expression as first parameter A and first parameter B, for each of the 21 cases (refer to step S322 in FIG. 14).

There are two types of cases; one is that first parameter A and first parameter B are real numbers (other than cases 13, 19 and 20), and the other, imaginary numbers (cases 13, 19 and 20).

Parameter estimation unit 33 deletes an imaginary part from first parameter A and first parameter B that are imaginary numbers to obtain one first parameter that is a real number (step S323 in FIG. 14).

The first parameter in each of the 21 cases after step S323 is shown as first parameter A and first parameter B in FIG. 17. One first parameter (real number) obtained by deleting the imaginary part in step S323 is shown as first parameter A. In such a case, "N/A" is indicated in the box of first parameter B.

Parameter estimation unit 33 obtains the number of first parameters within the normal range from first parameter A and first parameter B. In cases 13, 19 and 20, the number of first parameters within the normal range is 1. If the normal range is larger than 0 and smaller than 100, first parameters have negative values in cases 8 and 9, and thus the number of first parameters within the normal range is 1. If the number of first parameters within the normal range is 1, parameter estimation unit 33 selects such one first parameter (step S331 in FIG. 14). The first parameter selected in this way is shown in the box of "first parameter to be selected."

In cases other than the above (in other words, cases 1 to 7, 10 to 12, 14 to 18, and 21), the number of first parameters within the normal range is 2.

If the number of first parameters within the normal range is 1, parameter estimation unit 33 substitutes a single third statistical model expression obtained from the linear first statistical model expression for second and third parameters measured for evaluation to calculate a new first parameter (refer to step S325 in FIG. 14). The new first parameter is shown as first parameter C.

Parameter estimation unit 33 selects one of first parameter A and first parameter B that is closer to first parameter C. The first parameter thus selected is shown in the box of "first parameter to be selected."

A description is made of results of comparison with the true value for evaluation about the validity of a first parameter thus selected, with reference to FIG. 17.

In both cases where the number of first parameters within the normal range is 1 and 2, the overall tendency proves that ratio R of the difference between a selected first parameter and a true value to the true value is within approximately 15%. Ratio R is defined as $R=|P_{1s}-T|/T$, where $P_{1s}$ is a selected first parameter and T is a true value.

In the case where the number of first parameters within the normal range is 2, the results show that the one first parameter closer to a true value has been selected.

System 1 can thus appropriately estimate information indicating results of machining.

MODIFIED EXAMPLE

In the modified example, a description is made of another embodiment of a method of appropriately estimating information indicating results of machining.

Figure 18:
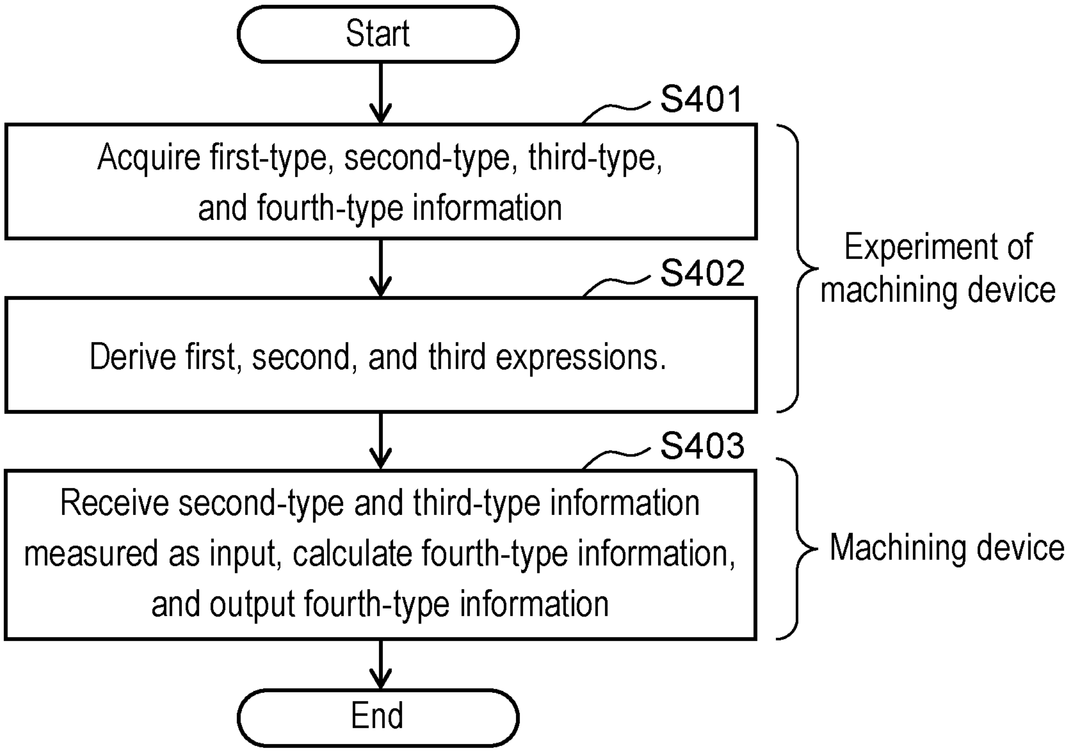
FIG. 18 is a flowchart showing the process executed by a system according to a modified example of the embodiment.

FIG. 18 is a flowchart showing the process (i.e., an estimation method) executed by system (also referred to as an estimation system) 2 according to the modified example. The process shown in FIG. 18 is another example of the process in FIG. 2.

As shown in step S401 in FIG. 18, generation device 10, after an experiment of machining a device is performed, acquires first-type and second-type information indicating conditions of the experiment of machining and third-type and fourth-type information indicating results of the experiment of machining.

In step S402, generation device 10 derives a first expression and a second expression, where the first expression receives first-type and second-type information as input and outputs third-type information as more than one solution and the second expression receives first-type and second-type information as input and outputs fourth-type information. Furthermore, generation device 10 derives more than one third expression, where the third expression receives the second-type and third-type information as input and calculates first-type information using the first expression.

In step S403, estimation device 20 receives second-type and third-type information measured in machining the device as input, calculates fourth-type information indicating results of machining the device using the second expression and the more than one third expression, and outputs the fourth-type information.

This allows system 2 to appropriately estimate information indicating results of machining.

Figure 19:
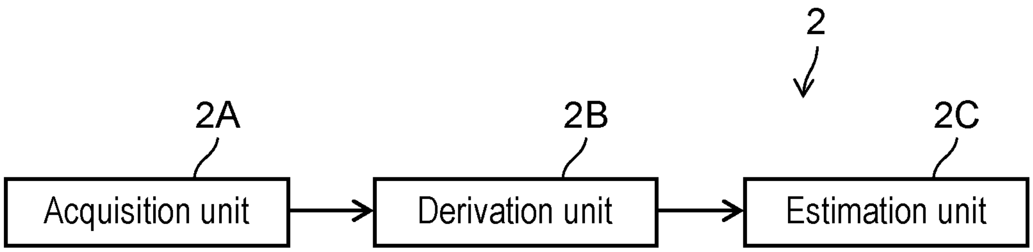
FIG. 19 is a schematic diagram of the configuration of the system according to the modified example of the embodiment.

FIG. 19 is a schematic diagram of the configuration of system 2 according to the modified example. The process shown in FIG. 19 is an example of another configuration of system 1 shown in FIG. 3.

As shown in FIG. 19, system 2 includes acquisition unit 2A, derivation unit 2B, and estimation unit 2C.

Acquisition unit 2A, after an experiment of machining a device is performed, acquires first-type and second-type information indicating conditions of the experiment of machining and third-type and fourth-type information indicating results of the experiment of machining.

Derivation unit 2B derives a first expression and a second expression, where the first expression receives first-type and second-type information as input and outputs third-type information as more than one solution. Derivation unit 2B also derives more than one third expression, where the third expression receives the second-type and third-type information as input and calculates the first-type information using the first expression.

Estimation unit 2C receives second-type and third-type information measured in machining the device as input, calculates fourth-type information indicating results of machining the device using the second expression and more than one third expression, and outputs the fourth-type information.

This allows system 2 to appropriately estimate information indicating results of machining.

As described above, according to the estimation method of the embodiment, fourth-type information in machining can be estimated from second-type and third-type information obtained in machining using the relational expression between the first-type, second-type, third-type, and fourth-type information obtained in experiment. During the process, for the first expression to output the third-type information as more than one solution, the fourth-type information indicating results of machining can be appropriately estimated using the more than one third expression. In this way, the above estimation method allows information indicating results of machining to be appropriately estimated.

Single fourth-type information indicating results of machining can be appropriately estimated using more appropriate single first-type information selected from one or more first-type information to be obtained using more than one third expression. Accordingly, the above estimation method allows information indicating results of machining to be appropriately estimated.

Fourth-type information indicating results of machining can be appropriately estimated using single first-type information close to new first-type information having been output using the fifth expression, selected from one or more first-type information to be obtained using more than one third expression. The new first-type information having been output using the fifth expression typically has a relatively small difference from the true value. Thus, when one or more first-type information can be obtained from more than one third expression, first-type information relatively close to the true value can be obtained by selecting first-type information that has the least difference from the above new first-type information, which allows fourth-type information to be appropriately estimated. In this way, the above estimation method allows information indicating results of machining to be appropriately estimated.

Fourth-type information indicating results of machining can be appropriately estimated using single first-type information within the normal range and also more appropriate, selected from one or more first-type information obtained using more than one third expression. Accordingly, the above estimation method allows information indicating results of machining to be appropriately estimated.

The imaginary parts of imaginary numbers are excluded from one or more first-type information obtained using more than one third expression to leave real numbers, and also more appropriate single first-type information is used to allow fourth-type information indicating results of machining to be appropriately estimated. Accordingly, the above estimation method allows information indicating results of machining to be appropriately estimated.

The determination based on a concrete form of the first expression allows fourth-type information to be appropriately estimated using more than one third expression. Accordingly, the above estimation method allows information indicating results of machining to be appropriately estimated more easily.

If information indicating conditions of machining includes information not measured and also information indicating results of machining includes information not measured, information indicating results of machining can be appropriately estimated. Accordingly, the above generation method allows a model that appropriately estimates information indicating results of machining to be generated even if information not measured in machining is included.

A model that appropriately estimates information indicating results of machining in laser welding can be generated more easily.

In the above embodiment, each component may be configured by a dedicated hardware device or by executing a software program suitable for the component. Each component may be implemented by a program execution unit (e.g., a CPU, a processor) reading and executing software programs recorded in a recording medium (e.g., a hard disk, semiconductor memory). Here, a software program that implements a generation device and an estimation device according to the above embodiment are as follows.

Specifically, the program makes a computer execute an estimation method. This method includes the following four steps. First, after an experiment of machining a device is performed, the computer acquires first-type, second-type, third-type, and fourth-type information, where the first-type and second-type information indicates conditions of the experiment of machining; and the third-type and fourth-type information indicates results of the experiment of machining. Second, the computer derives first and second expressions, where the first expression receives the first-type and second-type information as input and outputs the third-type information as more than one solution; and the second expression receives the first-type and second-type information as input and outputs the fourth-type information as more than one solution. Third, the computer derives more than one third expression, where the third expression receives the second-type and third-type information as input and outputs the first-type information using the first expression. Finally, the computer receives the second-type and the third-type information measured in machining the device as input and outputs the fourth-type information indicating results of machining of the device using the second expression and the more than one third expression.

Hereinbefore, the description is made of an estimation device and others according to one or more aspects based on the embodiment, but the disclosure is not limited to the embodiment. A new embodiment configured from the embodiment that has undergone various types of modification that those skilled in the art can devise and a new embodiment configured by combining components in different embodiments may be included in the range of one or more aspect.

What is claimed is:

1. An estimation method executed by a processor using memory, the estimation method comprising:

controlling a machining device that performs laser welding to perform an experiment of machining a device to acquire first-type information and second-type information each indicating conditions of the experiment of the machining and third-type and fourth-type information each indicating a result of the experiment of the machining, wherein the machining is the laser welding, the first type information includes a gap width between plates to be welded in the laser welding, the second type information includes a laser scanning speed in the laser welding, the third type information includes a surface welding width of a laser welded portion in the laser welding, and the fourth type information includes an interface welding width of the laser welded portion in the laser welding;

deriving a first expression and a second expression, wherein the first expression receives the first-type information and the second-type information as inputs and outputs the third-type information as a plurality of mathematically distinct solutions, and the second expression receives the first-type information and the second-type information as inputs and outputs the fourth-type information;

deriving a plurality of third expressions from the first expression, wherein each of the plurality of third expressions corresponds to a different one of the plurality of mathematically distinct solutions of the first expression, and wherein each of the plurality of third expressions receives the second-type information and the third-type information as inputs and outputs the first-type information;

receiving measured second-type information and measured third-type information each measured in the machining the device as inputs and outputting estimated fourth-type information indicating a result of the machining the device by (i) obtaining the first-type information by inputting the measured second-type information and the measured third-type information to the plurality of third expressions and (ii) obtaining the estimated fourth-type information by inputting the obtained first-type information and the measured second-type information to the second expression;

determining whether or not the estimated fourth type information conforms to a predetermined determination condition; and when the estimated fourth type information conforms to the predetermined determination condition, outputting first quality information indicating lack of a defect, and when the estimated fourth type information does not conform to the predetermined determination condition, outputting second quality information indicating a defect.

2. The estimation method of claim 1, the outputting of the estimated fourth-type information includes:

selecting single first-type information from a plurality of pieces of first-type information indicating conditions of machining the device having been output from the plurality of third expressions; and outputting the estimated fourth-type information indicating the result of machining the device using the single first-type information having been selected.

3. The estimation method of claim 2, further comprising:

deriving a fourth expression, wherein the fourth expression receives the first-type information and the second-type information as inputs, outputs the third-type information, and is a linear expression in the third-type information; and deriving a fifth expression from the fourth expression, wherein the fifth expression receives the second-type information and the third-type information as inputs and outputs new first-type information, wherein the outputting of the estimated fourth-type information includes:

selecting the first-type information as the single first-type information from the plurality of pieces of first-type information indicating conditions of machining the device output from the plurality of third expressions, the selected first-type information having least difference from the new first-type information having been output using the fifth expression with the measured second-type information and the measured third-type information measured in machining the device as inputs.

4. The estimation method of claim 2, wherein the outputting of the estimated fourth-type information includes:

selecting the first-type information from the plurality of pieces of first-type information indicating conditions of machining the device having been output from the plurality of third expressions, the selected first-type information being within a normal range; and outputting the estimated fourth-type information using the first-type information having been selected.

5. The estimation method of claim 2, wherein the outputting of the estimated fourth-type information includes:

if the plurality of pieces of first-type information indicating conditions of machining the device having been output from the plurality of third expressions is an imaginary number, deleting an imaginary part of the imaginary number; and outputting the estimated fourth-type information using the first-type information the imaginary part of which has been deleted.

6. The estimation method of claim 1, wherein the deriving of the plurality of third expressions includes:

determining whether or not the first expression is a quadratic or higher polynomial expression on the third-type information and is a polynomial expression that cannot be expressed by an n-th power of $(a \times x+b)$, x being the third-type information; and if the first expression is determined as the polynomial expression, deriving the plurality of third expressions.

7. The estimation method of claim 1, wherein the first-type information and the fourth-type information is predetermined information as information not measured in the machining, and the second-type information and the third-type information is predetermined information as information measured in the machining.

8. An estimation system comprising:

an acquisition unit that controls a machining device that performs laser welding to perform an experiment of machining a device to acquire first-type information and second-type information each indicating conditions of the experiment of the machining and third-type and fourth-type information each indicating a result of the experiment of the machining, wherein the machining is laser welding, the first type information includes a gap width between plates to be welded in the laser welding, the second type information includes a laser scanning speed in the laser welding, the third type information includes a surface welding width of a laser welded portion in the laser welding, and the fourth type information includes an interface welding width of the laser welded portion in the laser welding;

a derivation unit that derives a first expression, and a second expression, and a plurality of third expressions from the first expression, wherein the first expression receives the first-type information and the second-type information as inputs and outputs the third-type information as a plurality of mathematically distinct solutions, the second expression receives the first-type information and the second-type information as inputs and outputs the fourth-type information, and each of the plurality of third expressions corresponds to a different one of the plurality of mathematically distinct solutions of the first expressions receives the second-type information and the third-type information as inputs and outputs the first-type information; and an estimation unit that receives the measured second-type and measured third-type information each having been measured in the machining of the device and outputs the estimated fourth-type information indicating a result of the machining of the device by (i) obtaining the first-type information by inputting the measured second-type information and the measured third-type information to the plurality of third expressions and (ii) obtaining the estimated fourth-type information by inputting the obtained first-type information and the measured second-type information to the second expression, wherein estimation unit determines whether or not the estimated fourth type information conforms to a predetermined determination condition, and wherein the estimation system further comprises an output unit that, when the estimated fourth type information conforms to the predetermined determination condition, outputs first quality information indicating lack of a defect, and when the estimated fourth type information does not conform to the predetermined determination condition, outputs second quality information indicating a defect.

* * * * *